(12) United States Patent
Eisen et al.

(10) Patent No.: US 7,890,738 B2
(45) Date of Patent: Feb. 15, 2011

(54) METHOD AND LOGICAL APPARATUS FOR MANAGING PROCESSING SYSTEM RESOURCE USE FOR SPECULATIVE EXECUTION

(75) Inventors: Lee Evan Eisen, Round Rock, TX (US); David Stephen Levitan, Austin, TX (US); Francis Patrick O'Connell, Austin, TX (US); Wolfram M. Sauer, Nufingen (DE)

(73) Assignee: International Business Machines Corporation, Armonk, NY (US)

( * ) Notice: Subject to any disclaimer, the term of this patent is extended or adjusted under 35 U.S.C. 154(b) by 1793 days.

(21) Appl. No.: 11/039,498

(22) Filed: Jan. 20, 2005

(65) Prior Publication Data

US 2006/0161762 A1    Jul. 20, 2006

(51) Int. Cl.
*G06F 9/50* (2006.01)
*G06F 9/42* (2006.01)

(52) U.S. Cl. .................................................. 712/239
(58) Field of Classification Search ................ None
See application file for complete search history.

(56) References Cited

U.S. PATENT DOCUMENTS

| | | | |
|---|---|---|---|
| 5,719,800 A * | 2/1998 | Mittal et al. ................ 713/321 |
| 5,870,599 A | 2/1999 | Hinton et al. | |
| 5,881,278 A | 3/1999 | Tran et al. | |
| 5,918,046 A | 6/1999 | Hoyt et al. | |
| 5,935,241 A | 8/1999 | Shiell et al. | |
| 6,029,228 A * | 2/2000 | Cai et al. .................... 711/137 |
| 6,058,460 A * | 5/2000 | Nakhimovsky ............. 711/153 |
| 6,584,488 B1 * | 6/2003 | Brenner et al. ............. 718/103 |
| 6,766,441 B2 | 7/2004 | Sinharoy | |
| 6,792,524 B1 * | 9/2004 | Peterson et al. ............ 712/235 |
| 6,823,446 B1 | 11/2004 | Sinharoy | |
| 7,103,757 B1 * | 9/2006 | Kashyap ..................... 712/237 |
| 7,124,287 B2 | 10/2006 | Prasky et al. | |
| 7,330,988 B2 * | 2/2008 | Golla et al. ................. 713/322 |
| 7,487,505 B2 * | 2/2009 | Rosenbluth et al. ........ 718/104 |
| 2001/0014928 A1 * | 8/2001 | Chrysos et al. ............ 710/244 |
| 2003/0126479 A1 * | 7/2003 | Burns et al. ................. 713/300 |
| 2003/0188139 A1 * | 10/2003 | Chrysos et al. ............ 712/225 |
| 2004/0010679 A1 * | 1/2004 | Moritz et al. ................... 713/1 |
| 2005/0216714 A1 | 9/2005 | Grochowski | |

* cited by examiner

*Primary Examiner*—Eric Coleman
(74) *Attorney, Agent, or Firm*—Mitch Harris, Atty at Law, LLC; Andrew M. Harris; Matthew W. Baca

(57) ABSTRACT

A method and logical apparatus for managing processing system resource use for speculative execution reduces the power and performance burden associated with inefficient speculative execution of program instructions. A measure of the efficiency of speculative execution is used to reduce resources allocated to a thread while the speculation efficiency is low. The resource control applied may be the number of instruction fetches allocated to the thread or the number of execution time slices. Alternatively, or in combination, the size of a prefetch instruction storage allocated to the thread may be limited. The control condition may be comparison of the number of correct or incorrect speculations to a threshold, comparison of the number of correct to incorrect speculations, or a more complex evaluator such as the size of a ratio of incorrect to total speculations.

21 Claims, 4 Drawing Sheets

METHOD AND LOGICAL APPARATUS FOR MANAGING PROCESSING SYSTEM RESOURCE USE FOR SPECULATIVE EXECUTION

BACKGROUND OF THE INVENTION

1. Technical Field

The present invention relates generally to processors and computing systems, and more particularly, to a processor employing speculative execution of instruction streams.

2. Description of the Related Art

Present-day high-speed processors include the capability of simultaneous execution of instructions, speculative execution and loading of instructions and simultaneous operation of various resources within a processor. Simultaneous Multi-Threaded (SMT) processors support simultaneous execution of multiple instruction streams (hardware threads) within a processor core, providing more efficient use of resources within the core. Speculative execution involves predicting streams of program instructions in instruction memory for which execution is likely to be needed, loading data values associated with the predicted streams from data memory and speculatively executing the predicted streams in advance of the actual demand.

The purpose of speculative execution is to maximize the performance of a thread by executing instructions speculatively when the thread would otherwise be idle waiting for an event to occur before the execution path (and potentially data values) for those instructions is completely determined. If the speculation turns out to be correct, the result is improved performance of the thread. If the speculation turns out to be incorrect, the instruction stream typically must be flushed and then results discarded. Thus, speculative execution trades off potentially improved response time and throughput for the possibility of energy wasted on executing incorrectly predicted instruction streams. At a certain level, if speculative processing is not yielding much response time/throughput improvement (i.e., the speculation is not reaching a high level of accurate prediction), at least for a particular thread, the processing energy efficiency is reduced and system efficiency may be degraded severely over non-speculative execution of the threads that are not speculating well. In battery operated systems, it is clear that a high level of poor speculation would cause a condition of wasted potential processing power over the long term. However, in today's power-limited multi-processor and/or multi-threaded systems, a low quality of speculation can also degrade system performance by consuming power that could be more productively used by another hardware thread within a single multi-threaded core or by another core executing another thread.

Certain types of program instruction sequences and programs in general, lend themselves to branch prediction, while others do not. For example, fixed "for" loops of reasonably high iteration counts predictably execute the main body of the loop many times and execute initialization and termination paths only once each. When a speculative processor encounters such a loop, the branch prediction unit can yield high efficiency by predicting that the branch/jump instruction(s) that enter the main body of the loop will be taken each time, although at least on initialization and termination, the prediction will be incorrect. Other program structures, such as "if" decision statements, do not always yield good speculative performance. The worst-case is encountered at a branch probability of 50%, that is, when each path of a program branch becomes equally likely. Generally, without dedicated control informed by knowing the type of program code being executed, speculative operation is typically always enabled when it is used at all.

One technique for reducing the amount of processing power and/or resources wasted on inefficient speculation is disclosed in U.S. Pat. No. 6,792,524 assigned to International Business Machines Corporation, the specification of which is incorporated herein by reference. The accuracy of ongoing speculation is evaluated and the speculation is disabled either for a particular branch or an entire thread if the accuracy is low. However, the technique disclosed in the above-referenced patent still uses resources such as instruction queue space and instruction fetch cycles for the speculative paths not taken. Alternatively, the scheme completely removes the speculative streams from the processing model, potentially losing out on advance processing that could otherwise be performed for a thread.

It is therefore desirable to provide a speculative processing scheme and control mechanism that can reduce the amount of resources and energy wasted on poor speculation, while retaining the advantages of speculation for a thread where speculation is proceeding well.

SUMMARY OF THE INVENTION

The objective of providing a processor that reduces resources and energy wasted on poorly speculating program code or threads, while retaining the advantages of good speculation is provided in a processor and method of operation of the processor.

The processor includes a control unit that reduces execution resources allocated to a hardware thread in response to determining that speculative execution of instructions is proceeding poorly. The limited resources may include one or more of: instruction fetches or time slices (limiting the amount of processing power allocated to the thread), hardware thread priority and/or reducing the size of the prefetched instruction storage for the thread (thus reducing processing for that thread by throttling the available instruction queue). The condition for determining when to apply reduction of resources to a thread may be comparison of a number of correct or incorrect speculated branches to a threshold, comparison of the number of correct branches to incorrect branches, or computation of more sophisticated evaluators of speculation such as ratio of correct or incorrect speculations to the total number of speculations.

In one embodiment of the invention, the branch history table weighting values are counted to accumulate the number of incorrect branches predicted and is used as the control input for the resource control scheme.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

Figure 1:
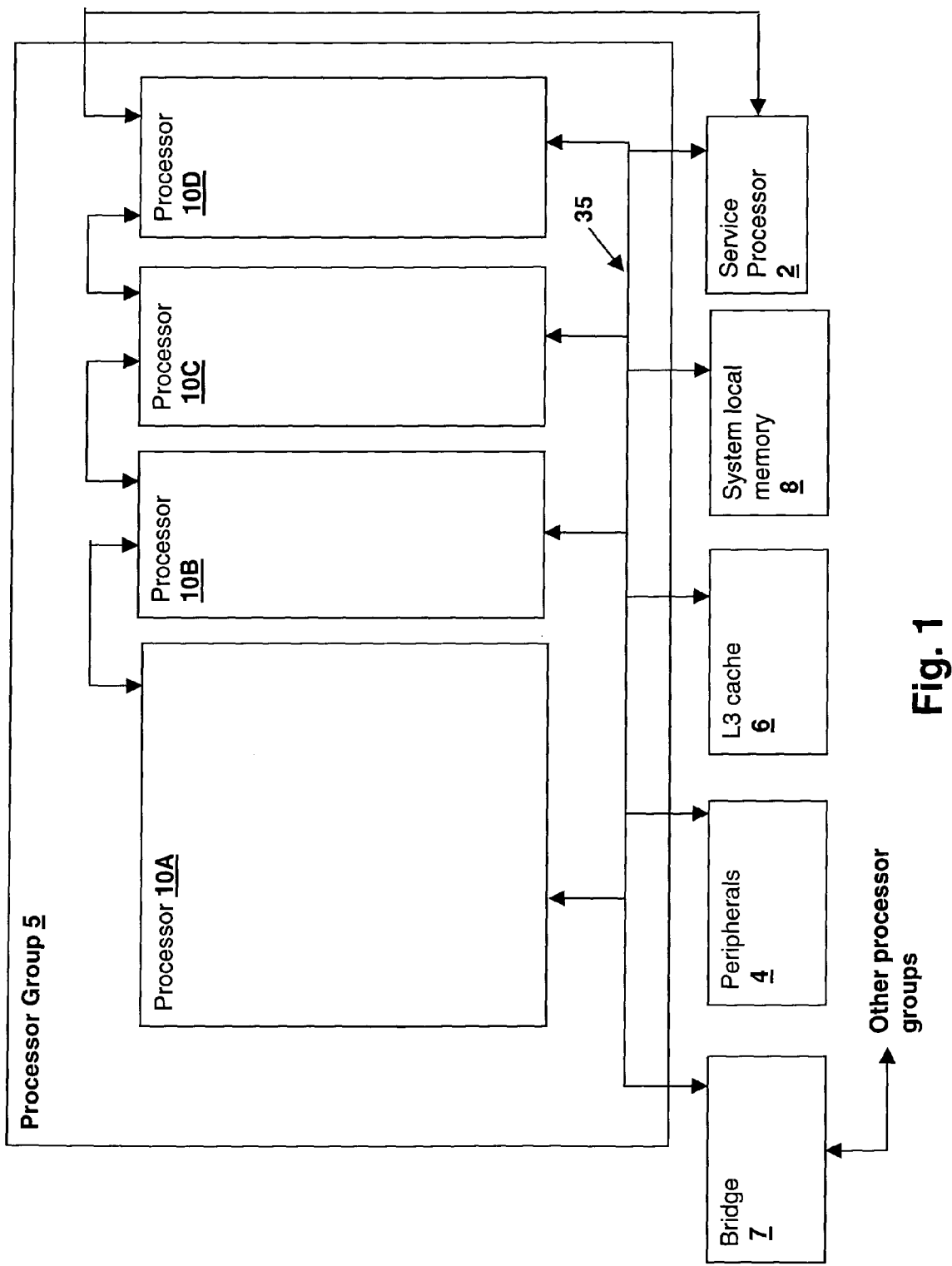
FIG. 1 is a block diagram of a system in accordance with an embodiment of the invention.

With reference now to the figures, and in particular with reference to FIG. 1, there is depicted a block diagram of a system in accordance with an embodiment of the present invention. The system includes a processor group 5 including multiple multi-threaded processors 10A-D that may be connected to other processor groups via a bridge 7 to form a large scalable processing system. The present invention may be practiced within a single processor that supports simultaneous multi-threading or in multiple processors within a large-scale system, such as that illustrated in FIG. 1. Within a system that includes multiple processors and/or multiple processor groups, the present invention provides potential reallocation of power between processors or processor groups by reducing the power consumed by a thread that has been speculating poorly. However, while power management is one benefit provided by the present invention, there are other benefits and advantages that will be illustrated below that apply in a single processor system, or a system where power is not limited.

Processor group 5 is connected to an L3 cache unit 6, system local memory 8 and various peripherals 4, as well as to a service processor 2. Service processor 2 can provide fault supervision, startup assistance and test capability to processor group 5 and may have a dedicated interconnect path to other processor groups as well as interconnecting to each of processors 10A-D. Processors 10A-D provide instruction execution and operation on data values for general-purpose processing functions. Bridge 7, as well as other bridges within the system provide communication over wide buses with other processor groups and bus 35 provides connection of processors 10A-D, bridge 7, peripherals 4, L3 cache 6 and system local memory 8. Other global system memory may be coupled external to bridge 7 for access by all processor groups.

Processors 10A-D are simultaneous multi-threaded (SMT) processors capable of concurrent and speculative execution of multiple threads. Each of processors 10A-D includes execution resources to support multiple streams of simultaneous execution, i.e. multiple hardware threads and further includes control circuitry (hardware) that determines the quality of speculation for each thread and reduces the processing power applied to a hardware thread upon determining that speculation for that thread is not proceeding efficiently.

Figure 2:
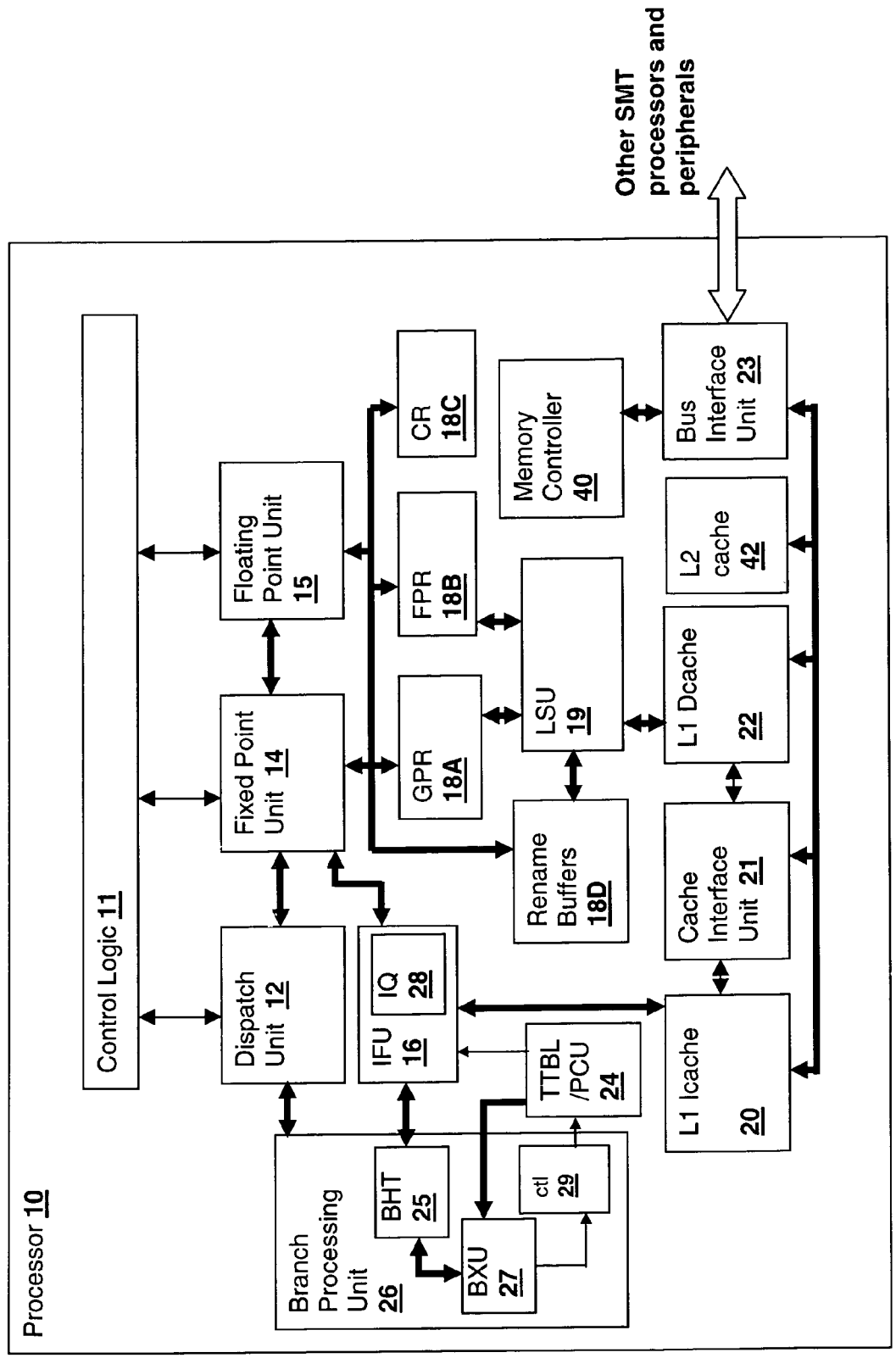
FIG. 2 is a block diagram of a processor 10 in accordance with an embodiment of the invention.

Referring now to FIG. 2, details of a processor 10 having features identical to processors 10A-D are depicted. A bus interface unit 23 connects processor 10 to other SMT processors and peripherals and connects L2 cache 42, L1 Dcache 22 for storing data values, L1 Icache 20 for storing program instructions and cache interface unit 21 to external memory, processors and other devices. L1 Icache 20 provides loading of instruction streams in conjunction with instruction fetch unit IFU 16, which prefetches instructions and may include storage for speculative loading of instruction streams. IFU 16 contains one or more instruction queues (IQ) 28 that can be depth-controlled for individual threads in accordance with an embodiment of the invention. A dispatch unit 12 controls sequencing of instructions issued to various internal units such as a fixed point unit (FXU) 14 for executing general operations and a floating point unit (FPU) 15 for executing floating point operations.

Fixed point unit 14 and floating point unit 15 are coupled to various resources such as general-purpose registers (GPR) 18A, floating point registers (FPR) 18B, condition registers (CR) 18C and rename buffers 18D. GPR 18A and FPR 18B provide data value storage for data values loaded and stored from L1 Dcache 22 by load store unit (LSU) 19. Rename buffers 18D (which may comprise several rename units associated with the various internal execution units) provides operand and result storage for the execution units.

IFU 16 receives direction from a program control unit/ thread table unit (TTBL/PCU) 24 that contains settings for managing thread execution, such as thread priority and per-thread control information so that IFU 16 can be directed to load an instruction sequence that represents the allocation of execution resources among the multiple hardware threads executing within processor 10. TTBL/PCU 24 is responsible therefore, for determining which hardware thread(s) receives the most processing cycles, instruction fetch cycles and/or execution time slices, depending on what particular method is used to sequence the instructions between threads. In general, each of the above represent similar control mechanisms in the context of the present invention, as reducing any of the above for a given thread will reduce the amount of processing power expended on the given thread, throttling its throughput and leading to a beneficial result of the present invention: throttling a poorly-speculating thread leads to earlier resolution of branch conditions, reducing waste of processing power. In processors that support a thread priority setting, the thread priority setting will generally use one of the above mechanisms to adjust the amount of execution resources allocated to that thread.

The instruction execution pipelines of present-day superscalar processors such as processor 10 are very deep (for example, 25 or more clock cycles may be required for an instruction to clear the pipeline), and for simplicity, resolution of branch conditions has generally been handled very late in the pipeline, when the condition register value upon which the branch instruction depends is assured to be in the resolved state. In addition, there is generally a finite and significant physical and electrical distance between the branch prediction unit and the unit resolving the branch condition. Therefore, even if the branch condition is actually known at the time a conditional branch is decoded, branch processing unit 26 generally still predicts the outcome of the branch using branch history table 25 and dispatches the instructions following the predicted path of the branch speculatively. With the throttling mechanism of the present invention, fewer instructions are likely to be dispatched speculatively for poorly predicted branch. Therefore, there are fewer speculative instructions present in the pipeline for the particular thread when the branch condition is resolved. The present invention provides a motivation to sample the condition earlier in the instruction pipeline, generally at several discrete cycle points of the pipeline, as the throttling action of the present invention provides higher likelihood that the condition will be available when the branch instruction reaches the earlier points in the branch execution pipeline. The combination of throttling and earlier resolution of the branch conditions minimizes the amount of speculative execution for a thread for which prediction is poor.

For the above purpose, TTBL/PCU 24 receives input from control logic 29 within branch processing unit 26. A branch execution unit (BXU) 27 within branch processing unit 26 manages speculative and non-speculative execution of instruction groups associated with branch instructions. A branch history table (BHT) 25 stores information about each branch instruction encountered (within a limit of storage of the table, which is content-addressed by a subset of bits from the branch address), and further stores information used by BXU 27 to decide which path to speculate from a branch instruction. Specifically, and as described in the above-incorporated Patent, each BHT entry includes two bits that indicate for each branch, a relative confidence and direction of speculation for each branch. A first bit represents the direction the branch condition has recently resolved and the second bit indicates whether the confidence in the direction is strong or weak (generally just an indication of whether or not the branch was predicted correctly on the previous time the branch was encountered). Whether or not a branch is executed speculatively, branch processing unit continues to predict (speculate) the direction of the branch, so BHT 25 is constantly updated as to the direction and strength of actual or potential speculation.

The present invention uses BHT 25 information to inform control logic 29 to control the execution resources of a hardware thread via TTBL/PCU 24 in conformity with the quality of speculative performance of that thread. In general, the description of the present invention centers around an ongoing speculative processing of the hardware thread, but the present invention could be used in conjunction with schemes such as that described in the above-incorporated Patent Application. However, the thread throttling action of the present invention would be disabled when speculation is disabled, as the branch prediction has no effect on performance when speculation is disabled and the throttling of a hardware thread does not generally improve the performance of the system if speculative execution is not enabled. Therefore, the techniques of the present invention are primarily an alternative to the scheme described in the above-incorporated Patent Application and provides a distinct advantage in that the throttling action/restoring action provided by the present invention provides a finer control than enabling/disabling speculation entirely.

Figure 3:
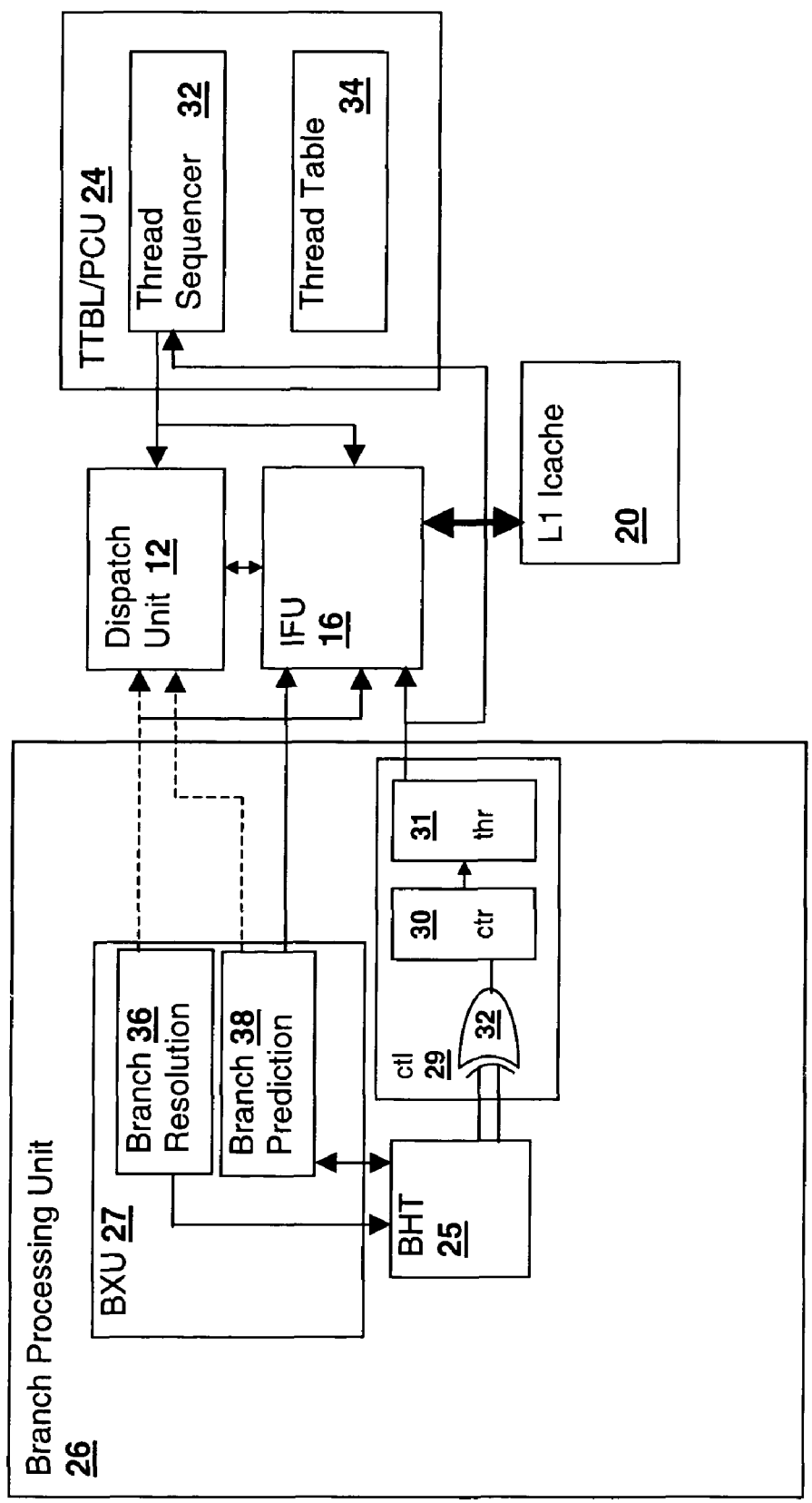
FIG. 3 is a pictorial diagram showing details within processor 10 of FIG. 2.

Referring now to FIG. 3, details of processor 10 are shown that support the method and provide the apparatus of an embodiment of the present invention. Within BXU 27 a branch resolution unit 36 determines when a branch condition is resolved (or receives such condition from such external units as a branch condition might specify), causing an update of BHT 25 for the branch address, and triggering control circuit 29 to increment counter 30 if the branch was predicted incorrectly. (The BHT bit values for this condition are 01 or 10, therefore logical XOR gate 32 represents the logical condition to increment counter 30). Counter 30 can be configured to count down on the exclusive-NOR condition once a threshold 31 has been exceeded, thus providing a "dead band" so that the thread priority/resource level is not continuously being adjusted. Threshold 31 represents a counter output or comparison circuit that determines that a predetermined number of bad branch predictions has been accumulated for the thread within a predetermined interval, or a count up/count down of counter 30 as controlled by XOR gate 32 can represent a positive/negative value indicating a degree of good/poor speculation and then hysteresis can be implemented at threshold 31 to provide stable control of thread resources/priority. Alternatively, counter 30 can be a pair of counters and threshold 31 can be a circuit for providing a ratio of counted good predictions to total counted branches, bad predictions to total branches, or ratio of good to bad predictions. Further, the input to control circuit 29 need not be taken from BHT 25 but can be any measure of the accuracy of the branch predictions. In general, any mathematical testing of the branch prediction accuracy to reduce thread resources during poorly speculating execution periods (more properly within poorly speculating code regions) and restore thread resources when predictions are again proceeding well, is contemplated by the present invention.

Figure 4:
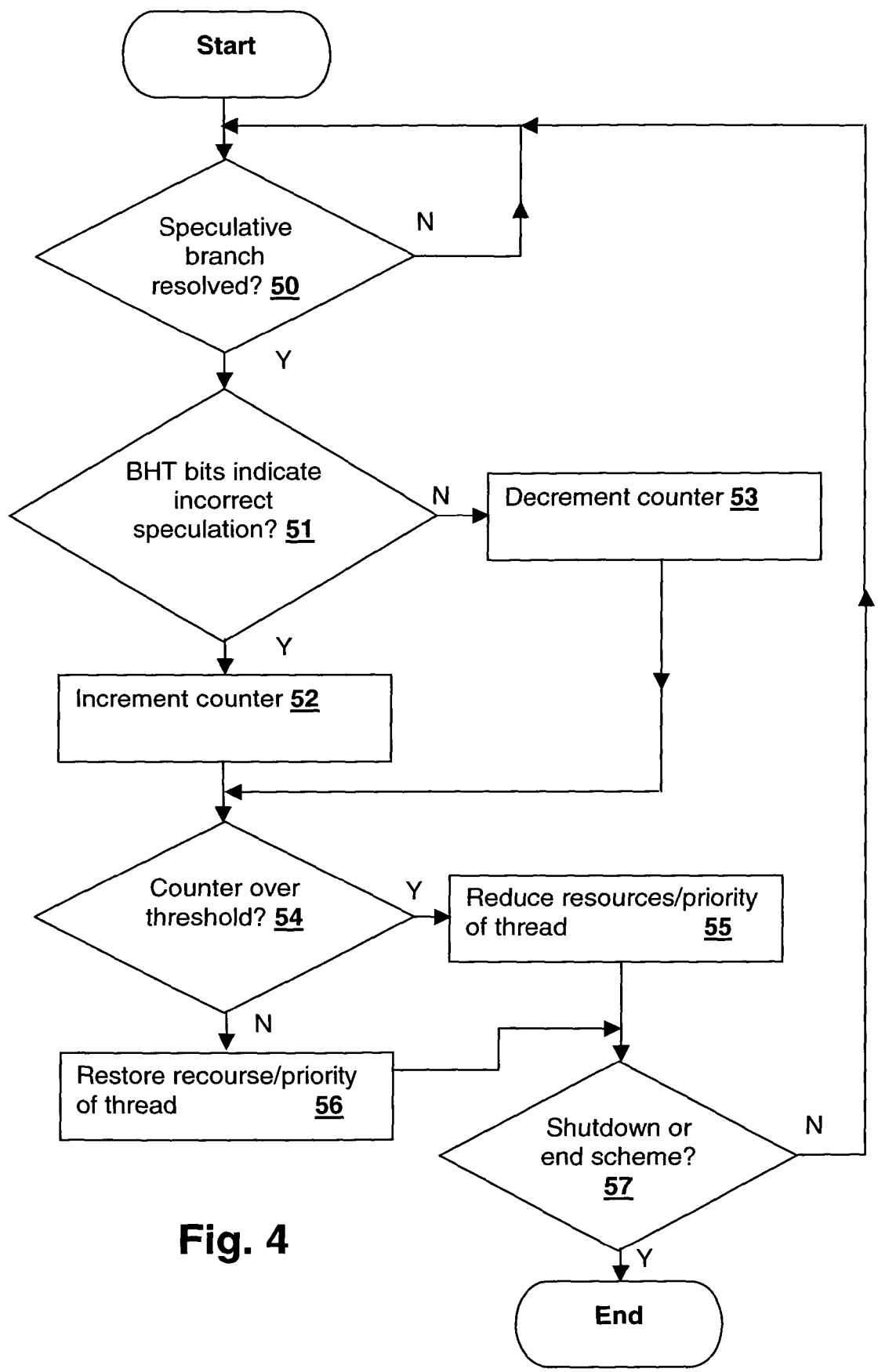
FIG. 4 is a flowchart depicting a method in accordance with an embodiment of the present invention.

Referring now to FIG. 4, a method for managing thread execution resources in accordance with an embodiment of the invention operating within processor 10 is depicted in a flow chart. At each resolution of a branch (step 50) if the BHT bits indicate that speculation was correct (step 51), then counter 30 is incremented (step 52), otherwise counter 30 is decremented (step 53). If the count exceeds a threshold (decision 54) then the priority/resources of the thread are decreased (step 55), otherwise if the count is not over the threshold (decision 54) the priority/resources of the thread can be restored if previously reduced (step 56). In general, a dead band will be employed such that once the threshold has been exceeded and the thread resources reduced, the prediction quality will have to rise above another threshold in order to restore the thread execution resources. The process continues until the scheme is ended or the system is shut down (decision 57).

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A method for managing execution in a processor, comprising:
   calculating a measure of branch prediction accuracy for a first hardware thread;
   determining whether or not said measure of branch prediction accuracy indicates that one or more other hardware threads should be favored over said first hardware thread; and
   in response to determining that said measure of branch prediction accuracy indicates that said one or more hardware other threads should favored over said first hardware thread, reducing execution resources available to said first hardware thread whereby said first hardware thread is throttled and instruction branches of said first thread are resolved in an earlier phase of speculative execution.

2. The method of claim 1, further comprising in response to determining that said measure of branch prediction accuracy indicates that said one or more hardware other threads should not be favored over said first hardware thread, increasing execution resources available to said first hardware thread whereby said first hardware thread is restored to normal execution state.

3. The method of claim 1, wherein said reducing lowers a priority of said first hardware thread.

4. The method of claim 1, wherein said reducing lowers a frequency of allowable instruction fetch cycles for said first hardware thread.

5. The method of claim 1, wherein said reducing lowers a number of execution slices allocated to said first hardware thread.

6. The method of claim 1, wherein said reducing reduces a size of a storage for speculatively loaded instructions associated with said first hardware thread.

7. The method of claim 1, wherein said calculating accumulates a number of incorrect branch predictions made for said first hardware thread, and wherein said determining compares said accumulated number to a threshold.

8. The method of claim 7, wherein said calculating further accumulates a number of correct branch predictions made for said first hardware thread, and wherein said determining further determines whether or not said accumulated number of correct branch predictions indicates that said one or more hardware other threads should not be favored over said first hardware thread.

9. The method of claim 1, wherein said calculating accumulates a first number of incorrect branch predictions made for said first hardware thread and a second number of correct branch predictions made for said first hardware thread, and wherein said determining determines whether or not said measure of branch prediction accuracy indicates that said one or more hardware other threads should favored over said first hardware thread in conformity with a mathematical function of said first and second numbers.

10. The method of claim 9, wherein said calculating computes a ratiometric relation between said first and second numbers and wherein said determining determines whether or not said ratiometric relation exceeds a threshold.

11. A processor supporting concurrent execution of multiple hardware threads, said processor comprising:
  an instruction fetch unit for loading sequences of instructions for execution by said processor, wherein the sequences of instructions correspond to the multiple hardware threads;
  a branch processing unit for detecting when branch instructions are encountered, predicting a likely path of said branch instructions by a branch prediction unit, indicating to said instruction fetch unit a set of instructions to speculatively load for execution by said processor for the branches by the multiple threads prior to a condition of said branches being resolved, and upon resolution of branch conditions of the branches, updating indications of accuracy of the predicting performed by the branch prediction unit for the corresponding hardware threads;
  a control circuit coupled to said branch processing unit for determining that the indication of branch prediction accuracy corresponding to a given hardware thread indicates that one or more other hardware threads should be favored over the given hardware thread; and
  a thread control coupled to said control circuit for reducing execution resources supplied to said given thread in response to an indication from said control circuit that said control circuit has determined that the one or more hardware other threads should be favored over the given hardware thread, whereby said given hardware thread is throttled and instruction branches of said given hardware thread are resolved in an earlier phase of speculative execution.

12. The processor of claim 11, wherein the control circuit determines that the one or more hardware other threads should be favored over the given hardware thread by comparing the branch prediction accuracy corresponding to the given hardware thread to a predetermined threshold, wherein said control circuit further determines when said branch prediction accuracy corresponding to the given hardware thread rises above said predetermined threshold, and wherein said thread control restores a level of said execution resources supplied to said given hardware thread in response to a second indication that said accuracy is above said predetermined threshold.

13. The processor of claim 12, wherein said control circuit comprises:
  a counter for counting a number of erroneous branch predictions when said branch processing unit has resolved said condition of said branch for each of such erroneous branch predictions; and
  a comparison circuit for comparing an output of said counter to said predetermined threshold.

14. The processor of claim 13, wherein said branch processing unit includes a branch history table for storing an indication of a likely branch direction for each branch in the branch history table along with an indication of a confidence of said branch direction, and wherein said counter is incremented each time a resolution of each branch does not match said stored indication of a likely branch direction.

15. The processor of claim 11, wherein said thread control is coupled to said instruction fetch unit, and wherein said instruction fetch unit reduces a number of instruction fetch cycles for said given hardware thread in response to said indication from said control circuit.

16. The processor of claim 11, wherein said thread control contains an indication of a priority of said given thread, and wherein said thread control adjusts said priority of said given hardware thread in response to said indication from said control circuit.

17. The processor of claim 11, wherein said thread control reduces a number of execution slices allocated to said given hardware thread in response to said indication from said control circuit.

18. The processor of claim 11, further comprising a storage for storing prefetched instructions for said given hardware thread, and wherein the size of the storage allocated to said given hardware thread is reduced in response to said indication from said control circuit.

19. The processor of claim 11, further comprising:
  a counter for counting a number of erroneous branch predictions when said branch processing unit has resolved said condition of said branch for each of such erroneous branch predictions; and
  a comparison circuit for comparing an output of said counter to a predetermined threshold, and wherein said comparison circuit further determines when said accuracy rises above said predetermined threshold, and wherein said thread control unit restores a level of said execution resources supplied to said given hardware thread in response to a second indication that said accuracy is above said predetermined threshold, and wherein said branch processing unit includes a branch history table for storing an indication of a likely branch direction for each branch in the branch history table along with an indication of a confidence of said branch direction, and wherein said counter is incremented each time a resolution of each branch does not match said stored indication of a likely branch direction, and wherein said thread control is coupled to said instruction fetch unit, and wherein said instruction fetch unit reduces a number of instruction fetch cycles for said given hardware thread in response to said indication from said control circuit.

20. A processor supporting concurrent execution of multiple hardware threads, said processor comprising:
  an instruction fetch unit for loading a sequence of instructions for execution by said processor;
  a branch processing unit for determining that a branch instruction has been encountered within a given hardware thread, determining a likely path of said branch and indicating to said instruction fetch unit an indicator of a set of instructions to speculatively load for execution by said processor prior to a condition of said branch being resolved;

a control circuit coupled to said branch processing unit for detecting when an accuracy of said determining by said branch processing unit is below a predetermined threshold; and a thread control coupled to said control circuit for reducing execution resources supplied to said given thread in response to an indication from said control circuit that said control circuit has detected that said accuracy is below said predetermined threshold, wherein said thread control reduces a number of execution slices allocated to said given hardware thread in response to said indication from said control circuit.

21. A processor supporting concurrent execution of multiple hardware threads, said processor comprising:

an instruction fetch unit for loading a sequence of instructions for execution by said processor;

a branch processing unit for determining that a branch instruction has been encountered within a given hardware thread, determining a likely path of said branch and indicating to said instruction fetch unit an indicator of a set of instructions to speculatively load for execution by said processor prior to a condition of said branch being resolved;

a control circuit coupled to said branch processing unit for detecting when an accuracy of said determining by said branch processing unit is below a predetermined threshold;

a storage for storing prefetched instructions for said given hardware thread; and a thread control coupled to said control circuit for reducing execution resources supplied to said given hardware thread in response to an indication from said control circuit that said control circuit has detected that said accuracy is below said predetermined threshold, and wherein the size of the storage allocated to said given hardware thread is reduced by the thread control in response to said indication from said control circuit.

* * * * *